US012627214B2

(12) United States Patent
Wu et al.

(10) Patent No.: US 12,627,214 B2
(45) Date of Patent: May 12, 2026

(54) SERIES-PARALLEL SWITCHING METHOD AND APPARATUS, POWER CONVERSION CIRCUIT, AND ELECTRONIC DEVICE

(71) Applicant: CONTEMPORARY AMPEREX TECHNOLOGY (HONG KONG) LIMITED, Hong Kong (CN)

(72) Inventors: Meng Wu, Ningde (CN); Guiying Lin, Ningde (CN); Jinfeng Gao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 273 days.

(21) Appl. No.: 18/354,397

(22) Filed: Jul. 18, 2023

(65) Prior Publication Data

US 2024/0006980 A1 Jan. 4, 2024

Related U.S. Application Data

(63) Continuation of application No. PCT/CN2021/126759, filed on Oct. 27, 2021.

(51) Int. Cl.
*H02M 1/00* (2007.01)
*H02J 7/90* (2026.01)
(Continued)

(52) U.S. Cl.
CPC .......... *H02M 1/0067* (2021.05); *H02J 7/933* (2026.01); *H02M 1/36* (2013.01);
(Continued)

(58) Field of Classification Search
CPC ................................................ H02M 1/0067
See application file for complete search history.

(56) References Cited

U.S. PATENT DOCUMENTS

| | | | | | |
|---|---|---|---|---|---|
| 11,152,853 | B2 * | 10/2021 | Li | ............................ | H02M 3/07 |
| 11,251,714 | B1 * | 2/2022 | Gao | .......................... | H02J 7/02 |

(Continued)

FOREIGN PATENT DOCUMENTS

| | | |
|---|---|---|
| CN | 207638558 U | 7/2018 |
| CN | 207657629 U | 7/2018 |

(Continued)

OTHER PUBLICATIONS

CN-110015058_translation, Xiong, Ying-jie (Year: 2019).*

(Continued)

*Primary Examiner* — Tynese V Mcdaniel
(74) *Attorney, Agent, or Firm* — Ladas & Parry LLP

(57) ABSTRACT

A series-parallel switching method and apparatus, a power conversion circuit, and an electronic device are provided. The power conversion circuit includes a control unit and two power conversion modules. The two power conversion modules are connected in series or connected in parallel. Either of the power conversion modules includes output terminals and first switch branches, where the first switch branches are connected to the output terminals, and the output terminals are configured to connect to a load. The first switch branches are connected to the control unit, and the first switch branches are configured to switch an operating state according to a control signal output by the control unit, to provide an energy discharge loop when the two power conversion modules are switched from a parallel connection to a series connection, where the operating state includes a stopping state and a running state.

9 Claims, 8 Drawing Sheets

(51) Int. Cl.
  H02M 1/36         (2007.01)
  H02M 3/335        (2006.01)

(52) U.S. Cl.
  CPC ... H02M 3/33573 (2021.05); H02M 3/33576
       (2013.01); *H02J 2207/20* (2020.01)

(56)              References Cited

U.S. PATENT DOCUMENTS

| | | | | |
|---|---|---|---|---|
| 2013/0286699 A1* | 10/2013 | Lee | H02J 3/381 | |
| | | | 363/71 | |
| 2017/0012535 A1* | 1/2017 | Raymond | H02M 3/28 | |
| 2018/0183335 A1* | 6/2018 | Fan | H02M 1/4225 | |
| 2020/0091738 A1* | 3/2020 | Kim | H02J 50/001 | |
| 2022/0209679 A1* | 6/2022 | Yu | H02M 7/068 | |
| 2023/0006540 A1* | 1/2023 | Wang | H02M 1/0095 | |
| 2023/0216316 A1* | 7/2023 | Li | H01M 10/441 | |
| | | | 320/124 | |
| 2023/0253886 A1* | 8/2023 | Yao | H02M 3/01 | |
| | | | 363/17 | |
| 2023/0307927 A1* | 9/2023 | Li | H02J 7/0048 | |
| 2023/0384395 A1* | 11/2023 | Wang | H02M 5/458 | |
| 2023/0387807 A1* | 11/2023 | Liu | H02M 3/335 | |
| 2024/0006980 A1* | 1/2024 | Wu | H02M 3/33576 | |

FOREIGN PATENT DOCUMENTS

| | | | | |
|---|---|---|---|---|
| CN | 110015058 A | * | 7/2019 | ............. B60L 53/60 |
| CN | 110015080 A | | 7/2019 | |
| CN | 110149041 A | | 8/2019 | |
| CN | 110798073 A | | 2/2020 | |
| CN | 111262268 A | | 6/2020 | |
| CN | 112751487 A | | 5/2021 | |
| CN | 214429294 U | | 10/2021 | |
| DE | 102011079214 A1 | | 1/2013 | |
| JP | H05236608 A | | 9/1993 | |
| JP | H0865889 A | | 3/1996 | |
| JP | 2010057288 A | | 3/2010 | |
| JP | 2011259517 A | | 12/2011 | |
| JP | 2014121229 A | | 6/2014 | |
| JP | 2014204627 A | | 10/2014 | |

OTHER PUBLICATIONS

Notice of Reasons for Refusal, JP application No. 2023-550108, dated Oct. 15, 2024, 5 pages.
Extended European Search Report for EP application No. 21961750.3, dated Feb. 12, 2024.
International Search Report for International Application PCT/CN2021/126759, mailed Jun. 24, 2022.
Written Opinion of International Search Authority for International Application PCT/CN2021/126759, mailed Jun. 24, 2022.

* cited by examiner

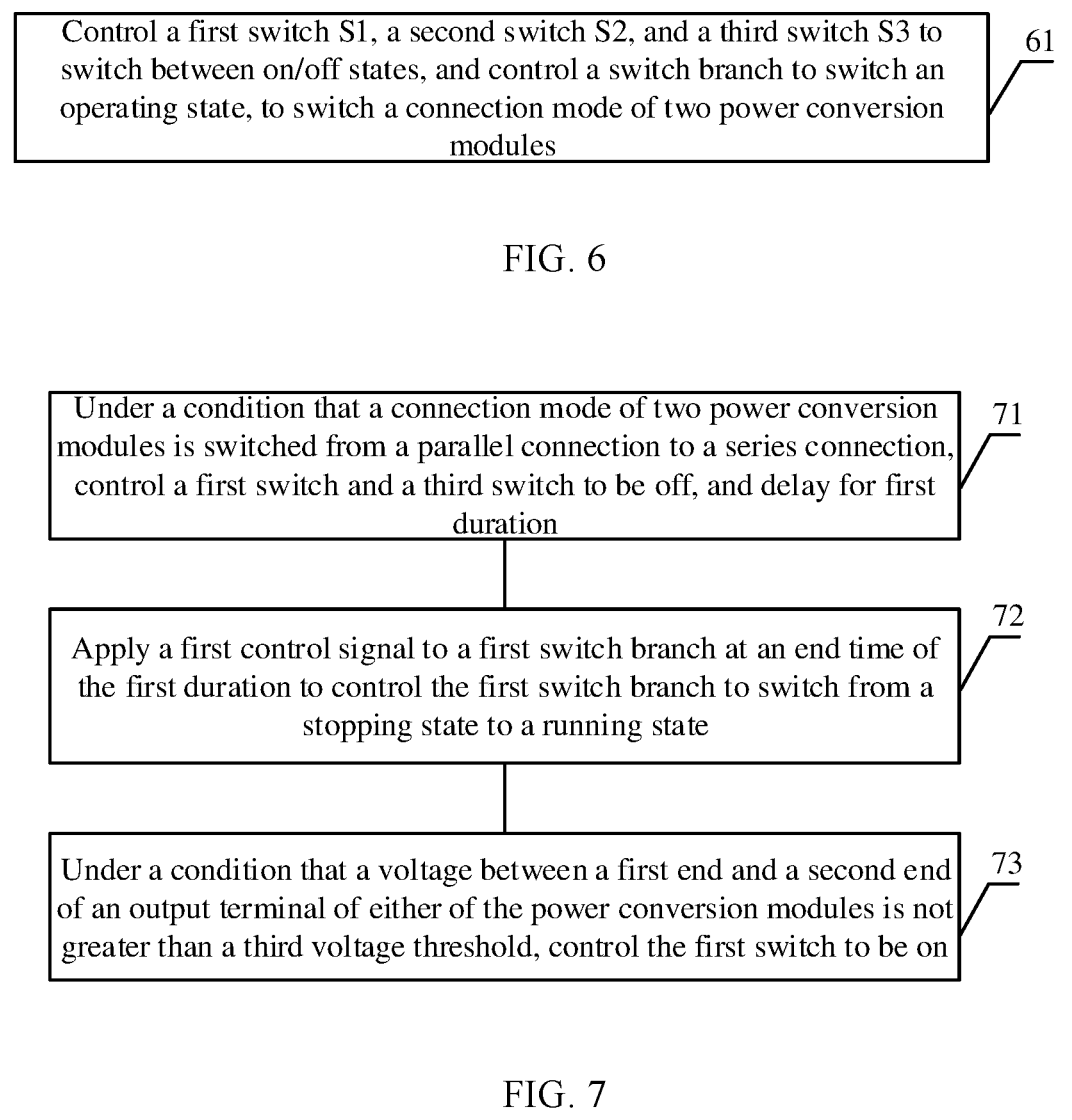

Control a first switch S1, a second switch S2, and a third switch S3 to switch between on/off states, and control a switch branch to switch an operating state, to switch a connection mode of two power conversion modules                    61

FIG. 6

Under a condition that a connection mode of two power conversion modules is switched from a parallel connection to a series connection, control a first switch and a third switch to be off, and delay for first duration                    71

Apply a first control signal to a first switch branch at an end time of the first duration to control the first switch branch to switch from a stopping state to a running state                    72

Under a condition that a voltage between a first end and a second end of an output terminal of either of the power conversion modules is not greater than a third voltage threshold, control the first switch to be on                    73

FIG. 7

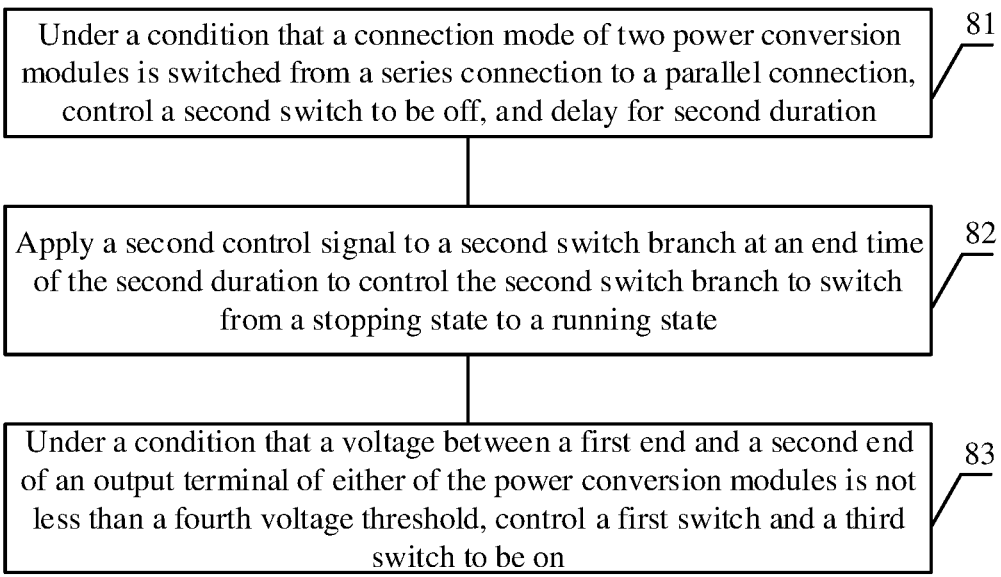

Under a condition that a connection mode of two power conversion modules is switched from a series connection to a parallel connection, control a second switch to be off, and delay for second duration — 81

Apply a second control signal to a second switch branch at an end time of the second duration to control the second switch branch to switch from a stopping state to a running state — 82

Under a condition that a voltage between a first end and a second end of an output terminal of either of the power conversion modules is not less than a fourth voltage threshold, control a first switch and a third switch to be on — 83

FIG. 8

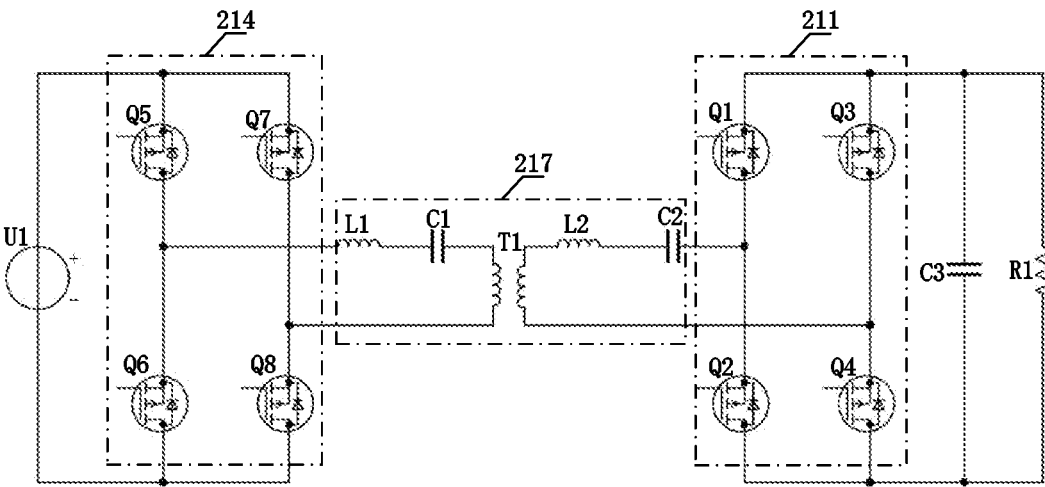

FIG. 9

SERIES-PARALLEL SWITCHING METHOD AND APPARATUS, POWER CONVERSION CIRCUIT, AND ELECTRONIC DEVICE

CROSS REFERENCE TO RELATED APPLICATION

This application is a continuation of International Patent Application No. PCT/CN2021/126759, filed on Oct. 27, 2021, which is incorporated by reference in its entirety.

TECHNICAL FIELD

This application relates to the field of charging technologies, and in particular, to a series-parallel switching method and apparatus, a power conversion circuit, and an electronic device.

BACKGROUND

In recent years, a quantity of motor vehicles in China has increased significantly, urban traffic congestion has increased, and automobile exhaust has become a main source of urban air pollution. To alleviate air pollution and reduce environmental problems caused by traditional fuel automobile exhaust, electric vehicle technologies are advancing rapidly and national policies are published to promote development, accompanied by a rapid increase of a new energy vehicle population in the market. Charging devices such as charging piles or vehicular chargers are basic facilities for new energy vehicles. Construction of the charging devices has become an important task to promote transformation and upgrade of vehicles in China and assist in green transportation.

In addition, as electric vehicles are continuously diversified, required charging voltages also change continuously. To broaden an output voltage range of a charging pile and reduce costs while improving efficiency, a plurality of power conversion modules in a series/parallel structure are usually used for implementation, to improve adaptability of a charging device to different charging objects. Specifically, the plurality of power conversion modules are in a series output state when a large voltage output is required, and the plurality of power conversion modules are in a parallel output state when a low voltage output is required.

However, in the prior art, when the plurality of power conversion modules are to be switched from a parallel connection to a series connection, usually, an additional module needs to be added to assist in completing the switching process, resulting in higher costs and a larger volume.

SUMMARY

This application is intended to provide a series-parallel switching method and apparatus, a power conversion circuit, and an electronic device. In this application, a parallel-series switching process can be implemented without adding an additional module, so that the power conversion circuit can have lower costs and a smaller volume.

To achieve the foregoing objective, according to a first aspect, this application provides a power conversion circuit. The circuit includes a control unit and two power conversion modules. The two power conversion modules are connected in series or connected in parallel. Either of the power conversion modules includes an output terminal and a first switch branch, where the first switch branch is connected to the output terminal, and the output terminal is configured to connect to a load. The first switch branch is connected to the control unit, and the first switch branch is configured to switch an operating state according to a first control signal output by the control unit, to provide an energy discharge loop when the two power conversion modules are switched from a parallel connection to a series connection, where the operating state includes a stopping state and a running state.

When the two power conversion modules are switched from the parallel connection to the series connection, the two power modules need to discharge energy, that is, discharge power. Then energy can be discharged by using the energy discharge loop provided by the first switch branches in the two power conversion modules. Because no additional discharge branch is added as in the related art, costs are lower and a volume is smaller. In addition, there is no need to add an additional discharge branch control process. In comparison with a solution to adding a discharge branch in the related art, there is less difficulty in control. Moreover, an existing solution to controlling the first switch branch may be further simply improved to obtain a solution to controlling the first switch branch to implement an energy discharge process. This helps simplify the control solution in a series-parallel switching process of the two power conversion modules, thereby reducing difficulty in control.

In an optional implementation, the power conversion module further includes an input terminal and a second switch branch. The second switch branch is connected to the input terminal, and the input terminal is configured to connect to an external input power supply. The second switch branch is connected to the control unit, and the second switch branch is configured to switch the operating state according to a second control signal output by the control unit, to charge the output terminal based on the input power supply when the two power conversion modules are switched from the series connection to the parallel connection.

When the two power conversion modules are switched from the series connection to the parallel connection, energy needs to be replenished for the two power modules, that is, charging is required. Then the operating state of the second switch branch in the two power conversion modules may be switched, so that the output terminal of the two power conversion modules is charged by using the input power supply. Similarly, because there is no need to add an additional charge branch, the costs are lower and the volume is smaller. In addition, on one hand, there is no need to add an additional discharge branch control process; on the other hand, an existing solution to controlling the first switch branch may be further simply improved to obtain a solution to controlling the first switch branch to implement an energy discharge process. Therefore, the control solution in the series-parallel switching process of the two power conversion modules can be simplified, and this helps reduce difficulty in control.

In an optional implementation, the power conversion circuit further includes a first switch, a second switch, and a third switch that are connected in sequence. The two power conversion modules include a first power conversion module and a second power conversion module. A first end of a first branch including the first switch, the second switch, and the third switch is connected to a first end of the output terminal of the first power conversion module, a second end of the first branch is connected to a second end of the output terminal of the second power conversion module, a connection point between the first switch and the second switch is connected to a first end of the output terminal of the second power conversion module, and a connection point between the second switch and the third switch is connected to a second end of the output terminal of the first power conversion module. If the first switch and the third switch are configured as on and the second switch is configured as off, the two power conversion modules are connected in parallel. If the second switch is configured as on and the first switch and the third switch are configured as off, the two power conversion modules are connected in series.

The first switch, the second switch, and the third switch are configured to implement series-parallel switching of the two power conversion modules. When the first switch and the third switch are on and the second switch is off, the first end of the output terminal of the first power conversion module is connected to the first end of the output terminal of the second power conversion module, and the second end of the output terminal of the first power conversion module is connected to the second end of the output terminal of the second power conversion module. In this case, the two power conversion modules are connected in parallel. When the second switch is on and the first switch and the third switch are off, the second end of the output terminal of the first power conversion module is connected to the first end of the output terminal of the second power conversion module. In this case, the two power conversion modules are connected in series.

According to a second aspect, this application provides a series-parallel switching method, applied to a power conversion circuit, where the power conversion circuit is configured to connect to a load, the power conversion circuit includes two power conversion modules, the two power conversion modules are connected in series or connected in parallel, and the power conversion module includes a switch branch. The series-parallel switching method includes: obtaining a first voltage between two ends of the load and a maximum output voltage of the power conversion module; and switching a connection mode of the two power conversion modules based on a current connection mode of the two power conversion modules, the first voltage, the maximum output voltage, and an operating state of the switch branch, where the connection mode includes a series connection and a parallel connection, and the operating state includes a stopping state and a running state.

In the power conversion circuit, when series-parallel switching of the two power conversion modules is required, switching may be implemented based on the current connection mode of the two power conversion modules, the first voltage, the maximum output voltage, and the operating state of the switch branch. In this case, a series-parallel switching process of the two power conversion modules is only related to parameters of the two power conversion modules and the switch branch, and there is no need to add an additional electronic component or the like. Therefore, the power conversion circuit can have lower costs and a smaller volume. In addition, the switch branch in the power conversion module is used, and an existing control solution can be used for reference. This helps simplify the control solution in the series-parallel switching process and reduce difficulty in control.

In an optional implementation, the switching a connection mode of the two power conversion modules based on a current connection mode of the two power conversion modules, the first voltage, the maximum output voltage, and an operating state of the switch branch includes: determining, based on the current connection mode of the two power conversion modules, the first voltage, and the maximum output voltage, whether the connection mode of the two power conversion modules needs to be switched; and if the connection mode of the two power conversion modules needs to be switched, switching the connection mode of the two power conversion modules based on the operating state of the switch branch.

Before the connection mode of the two power conversion modules is switched, it is first necessary to determine whether switching is required. Based on the first voltage required by the load, an output voltage of the power conversion module, and the current connection mode of the two power conversion modules, it can be more accurately determined whether the current connection mode of the two power conversion modules can enable the power conversion modules to have higher operation efficiency, and whether a voltage that can be provided can satisfy the first voltage required by the load. Therefore, it can be more accurately determined whether switching is required. This helps reduce a probability of wrong switching and provide operation stability of the power conversion circuit.

In an optional implementation, the determining, based on the current connection mode of the two power conversion modules, the first voltage, and the maximum output voltage, whether the connection mode of the two power conversion modules needs to be switched includes: if the current connection mode of the two power conversion modules is the series connection, and the first voltage is less than a difference between the maximum output voltage and a first voltage threshold, determining that the connection mode of the two power conversion modules needs to be switched.

If the two power conversion modules are currently connected in series, an output voltage is a sum of voltages of the two power conversion modules. If the first voltage is less than the difference between the maximum output voltage and the first voltage threshold, a single power conversion module can also meet the requirement of the load. Then the two power conversion modules can be switched to the parallel connection, so that an actual output voltage of the power conversion module is closer to the maximum output voltage of the power conversion module. In this way, conversion efficiency and conversion accuracy of the power conversion module can be improved, and this helps improve operation stability of the power conversion circuit.

In an optional implementation, the determining, based on the current connection mode of the two power conversion modules, the first voltage, and the maximum output voltage, whether the connection mode of the two power conversion modules needs to be switched includes: if the current connection mode of the two power conversion modules is the parallel connection, and the first voltage is greater than a sum of the maximum output voltage and a second voltage threshold, determining that the connection mode of the two power conversion modules needs to be switched.

If the two power conversion modules are currently connected in parallel, an output voltage is a voltage of a single power conversion module. If the first voltage is greater than the sum of the maximum output voltage and the second voltage threshold, the single power conversion module cannot meet the requirement of the load. Then the two power conversion modules need to be switched to the series connection to increase the output voltage to meet the first voltage required by the load.

In an optional implementation, the power conversion circuit further includes a first switch, a second switch, and a third switch that are connected in sequence, the two power conversion modules include a first power conversion module and a second power conversion module, and the power conversion module further includes an output terminal, where the output terminal is configured to connect to the load. A first end of a first branch including the first switch, the second switch, and the third switch is connected to a first end of the output terminal of the first power conversion module, a second end of the first branch is connected to a second end of the output terminal of the second power conversion module, a connection point between the first switch and the second switch is connected to a first end of the output terminal of the second power conversion module, and a connection point between the second switch and the third switch is connected to a second end of the output terminal of the first power conversion module. The switching the connection mode of the two power conversion modules based on the operating state of the switch branch includes: controlling the first switch, the second switch, and the third switch to switch between on/off states, and controlling the switch branch to switch the operating state, to switch the connection mode of the two power conversion modules, where the on/off states include turn-on and turn-off.

When the first switch and the third switch are on and the second switch is off, the first end of the first power conversion module is connected to the first end of the second power conversion module, and the second end of the first power conversion module is connected to the second end of the second power conversion module. In this case, the two power conversion modules are connected in parallel. When the second switch is on and the first switch and the third switch are off, the second end of the first power conversion module is connected to the first end of the second power conversion module. In this case, the two power conversion modules are connected in series.

In an optional implementation, the switch branch includes a first switch branch, and the first switch branch is connected to the output terminal. The controlling the first switch, the second switch, and the third switch to switch between on/off states, and controlling the switch branch to switch the operating state, to switch the connection mode of the two power conversion modules includes: under a condition that the connection mode of the two power conversion modules is switched from the parallel connection to the series connection, controlling the first switch and the third switch to be off, and delaying for first duration; applying a first control signal to the first switch branch at an end time of the first duration to control the first switch branch to switch from the stopping state to the running state; and under a condition that a voltage between the first end and the second end of the output terminal of either of the power conversion modules is not greater than a third voltage threshold, controlling the first switch to be on.

If the current connection mode of the two power conversion modules is the parallel connection, the first switch and the third switch are on, and the second switch is off. Switching the connection mode of the two power conversion modules to the series connection requires first turning off the first switch and the third switch and delaying for the first duration to determine that both the first switch and the third switch are already off. Then the first switch branch is switched to the running state to provide an energy discharge loop. Therefore, during the switching of the connection mode, the two power conversion modules can discharge energy by using the energy discharge loop, until the voltage between the first end and the second end of the output terminal of either of the power conversion modules is not greater than the third voltage threshold, and then the second switch is controlled to be on, to complete the switching process of the connection mode. In this process, the first switch branch in the power conversion module is used skillfully to discharge energy, and there is no need to add an additional discharge branch. Therefore, the costs can be reduced, and the volume can be reduced. In addition, the existing control solution can be used for reference. This helps reduce difficulty in control.

In an optional implementation, the power conversion module further includes an input terminal, and the switch branch includes a second switch branch, where the second switch branch is connected to the input terminal, and the input terminal is configured to connect to an external input power supply. The controlling the first switch, the second switch, and the third switch to switch between on/off states, and controlling the switch branch to switch the operating state, to switch the connection mode of the two power conversion modules includes: under a condition that the connection mode of the two power conversion modules is switched from the series connection to the parallel connection, controlling the second switch to be off, and delaying for second duration; applying a second control signal to the second switch branch at an end time of the second duration to control the second switch branch to switch from the stopping state to the running state; and under a condition that a voltage between the first end and the second end of the output terminal of either of the power conversion modules is not less than a fourth voltage threshold, controlling the first switch and the third switch to be on.

If the connection mode of the two power conversion modules is the series connection, the second switch is on, and the first switch and the third switch are off. In this case, switching the connection mode of the two power conversion modules to the parallel connection requires first turning off the second switch and delaying for the first duration to determine that the second switch is already off. Then the second switch branch is switched to the running state to charge the output terminal by using the external input power supply, until the voltage between the first end and the second end of the output terminal of either of the power conversion modules is not less than the fourth voltage threshold, and then the first switch and the third switch are controlled to be on, to complete the switching process of the connection mode. In this process, similarly, only the second switch module in the power conversion module is used for charging, and there is no need to add an additional charge branch. Therefore, the costs can be reduced, and the volume can be reduced. In addition, the existing control solution can be used for reference. This helps reduce difficulty in control.

According to a third aspect, this application provides a series-parallel switching apparatus, applied to a power conversion circuit, where the power conversion circuit is configured to connect to a load, the power conversion circuit includes two power conversion modules, the two power conversion modules are connected in series or connected in parallel, the power conversion module includes a switch branch, and the apparatus includes: a first obtaining unit, configured to obtain a first voltage between two ends of the load and a maximum output voltage of the power conversion module; and a first switching unit, configured to switch a connection mode of the two power conversion modules based on a current connection mode of the two power conversion modules, the first voltage, the maximum output voltage, and an operating state of the switch branch, where the connection mode includes a series connection and a parallel connection, and the operating state includes a stopping state and a running state.

In an optional implementation, the first switching unit is further configured to: determine, based on the current connection mode of the two power conversion modules, the first voltage, and the maximum output voltage, whether the connection mode of the two power conversion modules needs to be switched; and if the connection mode of the two power conversion modules needs to be switched, switch the connection mode of the two power conversion modules based on the operating state of the switch branch.

In an optional implementation, the first switching unit is further configured to: under a condition that the current connection mode of the two power conversion modules is the series connection, and the first voltage is less than a difference between the maximum output voltage and a first voltage threshold, determine that the connection mode of the two power conversion modules needs to be switched.

In an optional implementation, the first switching unit is further configured to: under a condition that the current connection mode of the two power conversion modules is the parallel connection, and the first voltage is greater than a sum of the maximum output voltage and a second voltage threshold, determine that the connection mode of the two power conversion modules needs to be switched.

In an optional implementation, the power conversion circuit further includes a first switch, a second switch, and a third switch that are connected in sequence, the two power conversion modules include a first power conversion module and a second power conversion module, and the power conversion module further includes an output terminal, where the output terminal is configured to connect to the load. A first end of a first branch including the first switch, the second switch, and the third switch is connected to a first end of the output terminal of the first power conversion module, a second end of the first branch is connected to a second end of the output terminal of the second power conversion module, a connection point between the first switch and the second switch is connected to a first end of the output terminal of the second power conversion module, and a connection point between the second switch and the third switch is connected to a second end of the output terminal of the first power conversion module. The first switching unit is further configured to: control the first switch, the second switch, and the third switch to switch between on/off states, and control the switch branch to switch the operating state, to switch the connection mode of the two power conversion modules, where the on/off states include turn-on and turn-off.

In an optional implementation, the switch branch includes a first switch branch, and the first switch branch is connected to the output terminal. The first switching unit is further configured to: under a condition that the connection mode of the two power conversion modules is switched from the parallel connection to the series connection, control the first switch and the third switch to be off, and delay for first duration; apply a first control signal to the first switch branch at an end time of the first duration to control the first switch branch to switch from the stopping state to the running state; and under a condition that a voltage between the first end and the second end of the output terminal of either of the power conversion modules is not greater than a third voltage threshold, control the second switch to be on.

In an optional implementation, the power conversion module further includes an input terminal, and the switch branch includes a second switch branch, where the second switch branch is connected to the input terminal, and the input terminal is configured to connect to an external input power supply. The first switching unit is further configured to: under a condition that the connection mode of the two power conversion modules is switched from the series connection to the parallel connection, control the second switch to be off, and delay for second duration; apply a second control signal to the second switch branch at an end time of the second duration to control the second switch branch to switch from the stopping state to the running state; and under a condition that a voltage between the first end and the second end of the output terminal of either of the power conversion modules is not less than a fourth voltage threshold, control the first switch and the third switch to be on.

According to a fourth aspect, this application provides a series-parallel switching apparatus, including a memory and a processor coupled to the memory, where the processor is configured to perform, based on instructions stored in the memory, the method according to the second aspect.

According to a fifth aspect, this application provides a charging device, including the power conversion circuit according to the first aspect and/or the series-parallel switching apparatus according to the third aspect or the fourth aspect.

In an optional implementation, the charging device is a charging pile or a charger.

According to a sixth aspect, this application provides a computer-readable storage medium, including computer-executable instructions for performing the method according to the second aspect.

Advantageous effects of the embodiments of this application are as follows: The power conversion circuit provided in this application includes the control unit and two power conversion modules. When the two power conversion modules are switched from the parallel connection to the series connection, the two power conversion modules need to discharge energy, that is, discharge power. Then the energy discharge loop can be provided by using the first switch branches in the two power conversion modules. Therefore, the two power conversion modules can discharge energy by using the energy discharge loop. Because no additional discharge branch is added as in the related art, the costs of the power conversion circuit are lower and the volume is smaller. In addition, there is no need to add an additional discharge branch control process. In comparison with the solution to adding a discharge branch in the related art, there is less difficulty in control. In addition, the existing solution to controlling the first switch branch may be further simply improved to obtain the solution to controlling the first switch branch to implement the energy discharge process. This helps simplify the control solution in the series-parallel switching process of the two power conversion modules, thereby reducing difficulty in control.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may still derive other drawings from the accompanying drawings without creative efforts.

FIG. 6 is a schematic diagram of an implementation of step 52 shown in FIG. 5 according to an embodiment of this application;

FIG. 7 is a schematic diagram of an implementation of step 61 shown in FIG. 6 according to an embodiment of this application;

FIG. 8 is a schematic diagram of another implementation of step 61 shown in FIG. 6 according to an embodiment of this application;

FIG. 9 is a schematic diagram of a circuit structure of a power conversion module according to an embodiment of this application;

Figure 1:
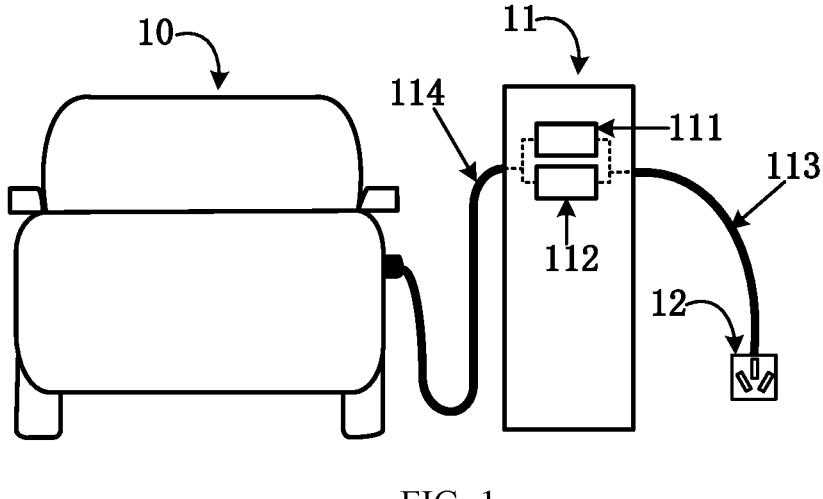
FIG. 1 is a schematic diagram of an application scenario according to an embodiment of this application.

The accompanying drawings are not drawn to scale.

DETAILED DESCRIPTION

The following further describes implementations of this application in detail with reference to accompanying drawings and embodiments. The detailed description of the following embodiments and the accompanying drawings are used to exemplarily illustrate the principle of this application, but cannot be used to limit the scope of this application, that is, this application is not limited to the described embodiments.

In the descriptions of this application, it should be noted that, unless otherwise specified, "plurality" means two or more; and orientations or position relationships indicated by the terms "upper", "lower", "left", "right", "inside", "outside", and the like are merely intended to help describe this application and simplify the descriptions other than indicate or imply that the apparatuses or components must have specific orientations, or be constructed and manipulated with specific orientations, and therefore shall not be construed as limitations on this application. In addition, the terms "first", "second", and "third" are merely intended for a purpose of description, and shall not be understood as an indication or implication of relative importance. "Vertical" means being vertical with an allowable range of error other than being strictly vertical. "Parallel" means being parallel with an allowable range of error other than being strictly parallel.

All orientation terms appearing in the following description are directions shown in the figures, and do not limit a specific structure of the application. In the descriptions of this application, it should be further noted that unless otherwise specified and defined explicitly, the terms "instal- lation", "link", and "connection" should be understood in their general senses. For example, the connection may be a fixed connection, a detachable connection, or an integrated connection, or may be a direct connection, or an indirect connection through an intermediate medium. Persons of ordinary skill in the art can understand specific meanings of the terms in this application based on specific situations.

In recent years, the new energy vehicle industry has witnessed explosive growth. Battery cells are the core of electric vehicles and also a comprehensive representation of automotive engineering and electrical engineering technolo- gies. In addition, as electric vehicles are continuously diver- sified, required charging voltages also change continuously. To broaden an output voltage range of a charging pile and reduce costs while improving efficiency, a plurality of power conversion modules in a series/parallel structure are usually used for implementation, to improve adaptability of a charg- ing device to different charging objects. Specifically, the plurality of power conversion modules are in a series output state when a large voltage output is required, and the plurality of power conversion modules are in a parallel output state when a low voltage output is required. If the plurality of power conversion modules are connected in parallel, an output voltage of the charging device is an output voltage of a single power conversion module. If the plurality of power conversion modules are connected in series, an output voltage of the charging device is a sum of output voltages of all the power conversion modules.

It is found that, currently, in the charging device, to keep the output voltage of the charging device substantially unchanged in a parallel-series switching process of the plurality of power conversion modules, the charging device is required to have an energy discharge capability to dis- charge energy efficiently. For example, assuming that two power conversion modules are disposed in the charging device and that an output voltage of either of the power conversion modules is 500 V, output voltages of the two power conversion modules connected in parallel are 500 V. If the two power conversion modules are switched from a parallel connection to a series connection, the output voltage of either of the power conversion modules needs to be reduced to 250 V to keep the output voltage of the charging device substantially unchanged. Therefore, the charging device needs to have an energy discharge capability to reduce the output voltage of either of the power conversion modules from 500 V to 250 V.

In the related art, usually, a discharge branch needs to be added to discharge energy. The discharge branch may include a switch and a resistor, and the switch connects the resistor to a loop to consume energy by using the resistor, thereby completing an energy discharge process.

However, the additional discharge branch added in the foregoing manner not only causes the costs and volume of the charging device to increase, but also requires addition of a discharge branch control process, that is, it causes an increase of difficulty in control and may further cause a decrease of operation efficiency.

Based on this, the applicant designs a power conversion circuit. In the power conversion circuit, an energy discharge loop may be provided by using a first switch branch in two power conversion modules, to implement an energy dis- charge process when the two power conversion modules are switched from a parallel connection to a series connection. In the solution of this application, the energy discharge process is implemented only by using the first switch branch in the power conversion module, and there is no need to add an additional discharge branch. In comparison with a solu- tion to adding a discharge branch in the related art, costs are lower and a volume is smaller. In addition, there is no need to add an additional discharge branch control process. In comparison with the solution to adding a discharge branch in the related art, there is less difficulty in control. Moreover, an existing solution to controlling the first switch branch may be used for reference, that is, the existing solution to controlling the first switch branch may be simply improved to obtain a solution to controlling the first switch branch to implement the energy discharge process. This helps simplify the control solution in a series-parallel switching process of the two power conversion modules, thereby reducing difficulty in control.

The power conversion circuit disclosed in this embodiment of this application may be used in a charging device such as a charger or a charging pile, but this is not limited.

To facilitate understanding of this application, one application scenario in which this application can be applied is first described. As shown in FIG. 1, the application scenario includes an electric vehicle 10, a charging pile 11, and an interface 12. The charging pile 11 includes a 1st power conversion module 111, a 2nd power conversion module 112, a power cable 113, and a charging cable 114.

The power cable 113 is configured to connect to an external input power supply (for example, mains) through the interface 12 (for example, a socket) to obtain an input voltage. The 1st power conversion module 111 and the 2nd power conversion module 112 may be connected in series or connected in parallel. For example, in FIG. 1, the 1st power conversion module 111 and the 2nd power conversion module 112 are connected in parallel. The 1st power conversion module 111 and the 2nd power conversion module 112 can convert the input voltage obtained through the interface 12 into a voltage that can be used to charge the electric vehicle 10, and charge the electric vehicle 10 by using the charging cable 114.

It should be noted that in this embodiment, a charging pile is used as an example of a charging device. However, in other embodiments, the charging device may alternatively be but is not limited to a vehicular charger, a non-vehicular charger, or the like.

Figure 2:
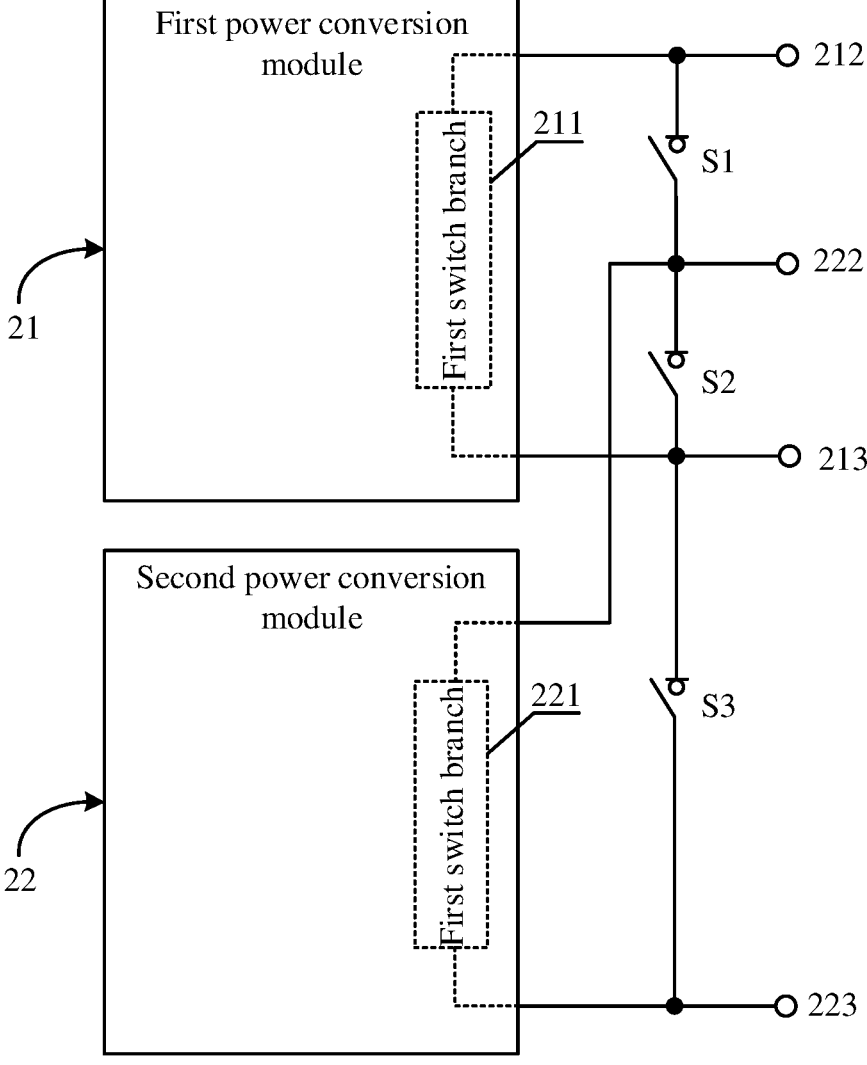
FIG. 2 is a schematic diagram of a structure of a power conversion circuit according to an embodiment of this application.

As shown in FIG. 2, the power conversion circuit includes a control unit (not shown in the figure) and two power conversion modules, where the two power conversion modules are a first power conversion module 21 and a second power conversion module 22. Either of the power conversion modules includes an output terminal and a first switch branch. To be specific, the first power conversion module 21 includes a first switch branch 211 and an output terminal, and the output terminal of the first power conversion module 21 includes a first end 212 and a second end 213; and the second power conversion module 22 includes a first switch branch 221 and an output terminal, and the output terminal of the second power conversion module 22 includes a first end 222 and a second end 223.

Specifically, the first power conversion module 21 and the second power conversion module 22 may be connected in parallel or connected in series. The first switch branch 211 of the first power conversion module 21 is connected to the first end 212 and the second end 213 of the output terminal of the first power conversion module 21 respectively, and the first switch branch 221 of the second power conversion module 22 is connected to the first end 222 and the second end 223 of the output terminal of the second power conversion module 22 respectively. In addition, the output terminal of the first power conversion module 21 and the output terminal of the second power conversion module 22 are both configured to connect to a load. The first switch branch 211 of the first power conversion module 21 and the first switch branch 221 of the second power conversion module 22 are both connected to the control unit.

In an actual application, the first switch branch 211 of the first power conversion module 21 and the first switch branch 221 of the second power conversion module 22 are both controlled by the control unit and switch an operating state according to a first control signal output by the control unit, where the operating state of both the first switch branch 211 of the first power conversion module 21 and the first switch branch 221 of the second power conversion module 22 includes a stopping state and a running state. The stopping state means that each switch in the first switch branch 211 of the first power conversion module 21 and the first switch branch 221 of the second power conversion module 22 remains in the current status, that is, no turn-on or turn-off action is performed. The running state means that at least one switch in the first switch branch 211 of the first power conversion module 21 and the first switch branch 221 of the second power conversion module 22 is turned on or turned off under the action of the first control signal. In addition, when the first switch branch 211 of the first power conversion module 21 and the first switch branch 221 of the second power conversion module 22 are in the running state, the first switch branch 211 of the first power conversion module 21 and the first switch branch 221 of the second power conversion module 22 can implement energy transfer; conversely, when the first switch branch 211 of the first power conversion module 21 and the first switch branch 221 of the second power conversion module 22 are in the stopping state, the first switch branch 211 of the first power conversion module 21 and the first switch branch 221 of the second power conversion module 22 cannot transfer energy.

As can be learned from above, when the first power conversion module 21 and the second power conversion module 22 need to switch from a parallel connection to a series connection, the first power conversion module 21 and the second power conversion module 22 need to discharge energy, that is, need to discharge power. In this case, the first switch branch 211 of the first power conversion module 21 and the first switch branch 221 of the second power conversion module 22 may be controlled by the control unit to switch from the stopping state to the running state to provide an energy discharge loop. In this way, the first power conversion module 21 and the second power conversion module 22 can transfer energy to be discharged, to an electronic component for consumption through the energy discharge loop in an energy transfer mode to implement an energy discharge process.

In this embodiment, when the first power conversion module 21 and the second power conversion module 22 are switched from the parallel connection to the series connection, the energy discharge process is implemented, and no additional discharge branch is added as in the related art. Therefore, costs of the power conversion circuit can be reduced, and a volume of the power conversion circuit can be reduced. In addition, on one hand, there is no need to add an additional discharge branch control process; on the other hand, an existing solution to controlling the first switch branch may be further simply improved to obtain a solution to controlling the first switch branch to implement the energy discharge process. Therefore, the control solution in the series-parallel switching process of the two power conversion modules can be simplified, and this helps reduce difficulty in control.

Figure 3:
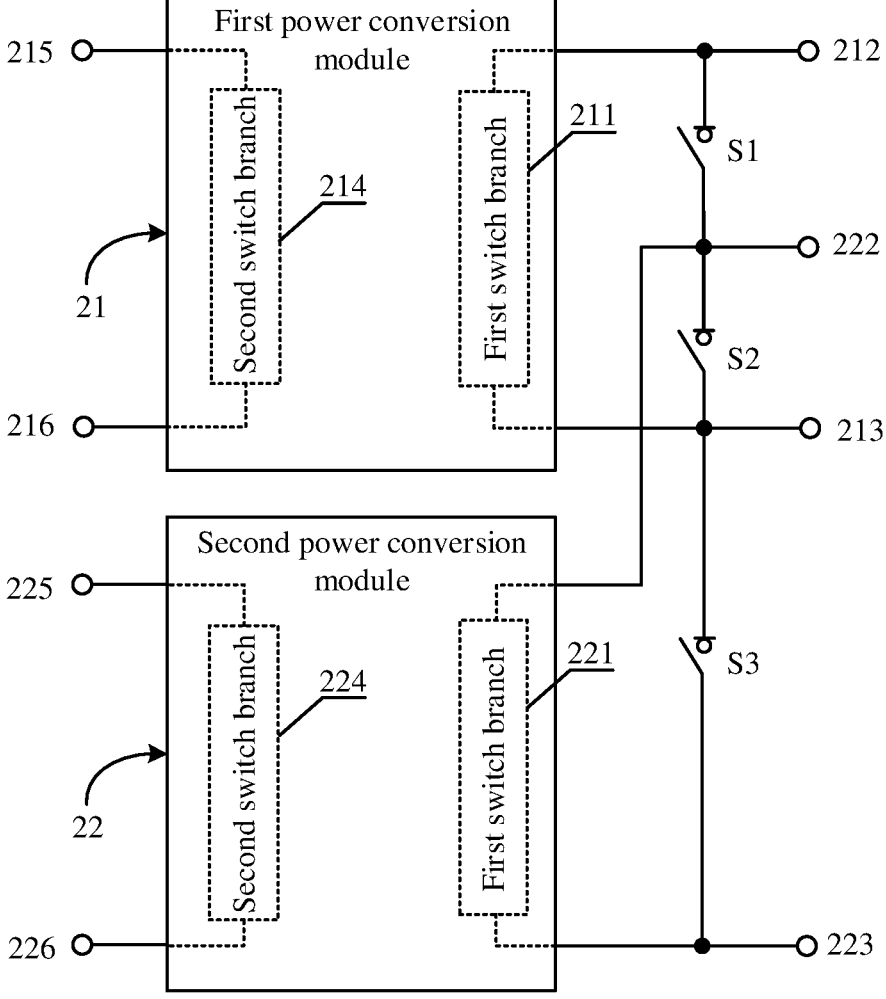
FIG. 3 is a schematic diagram of a structure of a power conversion circuit according to another embodiment of this application.

In an embodiment, as shown in FIG. 3, either of the power conversion modules further includes an input terminal and a second switch branch. To be specific, the first power conversion module 21 further includes a second switch branch 214 and an input terminal, and the input terminal of the first power conversion module 21 includes a first end 215 and a second end 216; and the second power conversion module 22 further includes a second switch branch 224 and an input terminal, and the input terminal of the second power conversion module 22 includes a first end 225 and a second end 226.

Specifically, the second switch branch 214 is connected to the first end 215 and the second end 216 of the input terminal of the first power conversion module 21 respectively, and the second switch branch 224 is connected to the first end 225 and the second end 226 of the input terminal of the second power conversion module 22 respectively. In addition, the input terminal of the first power conversion module 21 and the input terminal of the second power conversion module 22 are both configured to connect to the external input power supply. The second switch branch 214 of the first power conversion module 21 and the second switch branch 224 of the second power conversion module 22 are both connected to the control unit.

In an actual application, the second switch branch 214 of the first power conversion module 21 and the second switch branch 224 of the second power conversion module 22 are both controlled by the control unit and switch an operating state according to a second control signal output by the control unit, where the operating state of both the second switch branch 214 of the first power conversion module 21 and the second switch branch 224 of the second power conversion module 22 includes a stopping state and a running state. The stopping state means that each switch in the second switch branch 214 of the first power conversion module 21 and the second switch branch 224 of the second power conversion module 22 remains in the current status, that is, no turn-on or turn-off action is performed. The running state means that at least one switch in the second switch branch 214 of the first power conversion module 21 and the second switch branch 224 of the second power conversion module 22 is turned on or turned off under the action of the second control signal. In addition, when the second switch branch 214 of the first power conversion module 21 and the second switch branch 224 of the second power conversion module 22 are in the running state, the second switch branch 214 of the first power conversion module 21 and the second switch branch 224 of the second power conversion module 22 can implement energy transfer; conversely, when the second switch branch 214 of the first power conversion module 21 and the second switch branch 224 of the second power conversion module 22 are in the stopping state, the second switch branch 214 of the first power conversion module 21 and the second switch branch 224 of the second power conversion module 22 cannot transfer energy.

When the first power conversion module 21 and the second power conversion module 22 need to switch from the series connection to the parallel connection, energy needs to be replenished for the first power conversion module 21 and the second power conversion module 22, that is, charging is required. For example, assuming that the first power conversion module 21 and the second power conversion module 22 are connected in series and that output voltages of the first power conversion module 21 and the second power conversion module 22 are 250 V, if the first power conversion module 21 and the second power conversion module 22 are switched to the parallel connection, to keep the voltages of the power conversion modules substantially unchanged, the output voltages of the first power conversion module 21 and the second power conversion module 22 need to be increased to 500 V. In this case, the second switch branch 214 and the second switch branch 224 may be controlled by the control unit to switch from the stopping state to the running state to provide a charge loop. In this way, the external input power supply can charge the output terminal of the first power conversion module 21 and the output terminal of the second power conversion module 22 through the charge loop to increase a voltage of the output terminal of the first power conversion module 21 and a voltage of the output terminal of the second power conversion module 22, thereby completing the switching of the first power conversion module 21 and the second power conversion module 22 from the series connection to the parallel connection. Similarly, in this embodiment, because there is no need to add an additional charge branch, the costs are lower and the volume is smaller. In addition, an existing solution to controlling the second switch branch may be further simply improved to obtain a solution to controlling the second switch branch to charge the output terminal of the first power conversion module 21 and the output terminal of the second power conversion module 22, that is, the difficulty in control can be reduced.

In an embodiment, referring to FIG. 2 and FIG. 3, the power conversion circuit further includes a first switch S1, a second switch S2, and a third switch S3 that are connected in sequence. The first switch S1, the second switch S2, and the third switch S3 are connected in series. A first end of a first branch including the first switch S1, the second switch S2, and the third switch S3 is connected to the first end 212 of the output terminal of the first power conversion module 21, and the second end of the first branch is connected to the second end 223 of the output terminal of the second power conversion module 22. A connection point between the first switch S1 and the second switch S2 is connected to the first end 222 of the output terminal of the second power conversion module 22, and a connection point between the second switch S2 and the third switch S3 is connected to the second end 213 of the output terminal of the first power conversion module 21.

Specifically, the first switch S1, the second switch S2, and the third switch S3 are configured to implement series-parallel switching of the first power conversion module 21 and the second power conversion module 22. When the first switch S1 and the third switch S3 are on and the second switch S2 is off, the first end 212 of the output terminal of the first power conversion module 21 is connected to the first end 222 of the output terminal of the second power conversion module 22, and the second end 213 of the output terminal of the first power conversion module 21 is connected to the second end 223 of the output terminal of the second power conversion module 22. In this case, the first power conversion module 21 and the second power conversion module 22 are connected in parallel. When the second switch S2 is on and the first switch S1 and the third switch S3 are off, the second end 213 of the output terminal of the first power conversion module 21 is connected to the first end 223 of the output terminal of the second power conversion module 22. In this case, the first power conversion module 21 and the second power conversion module 22 are connected in series.

It should be noted that each switch in this embodiment of this application may be any electronic component that can serve as a switch, such as a metal-oxide-semiconductor field-effect transistor MOSFET, an insulated gate bipolar transistor IGBT, a silicon controlled rectifier SCR, a gate turn-off thyristor GTO, or a giant transistor GTR, or any commonly used switch, such as a contactor, a relay, a time-delay switch, a photoelectric switch, a tact switch, or a proximity switch, or a variety of combinations of the foregoing switches.

Figure 4:
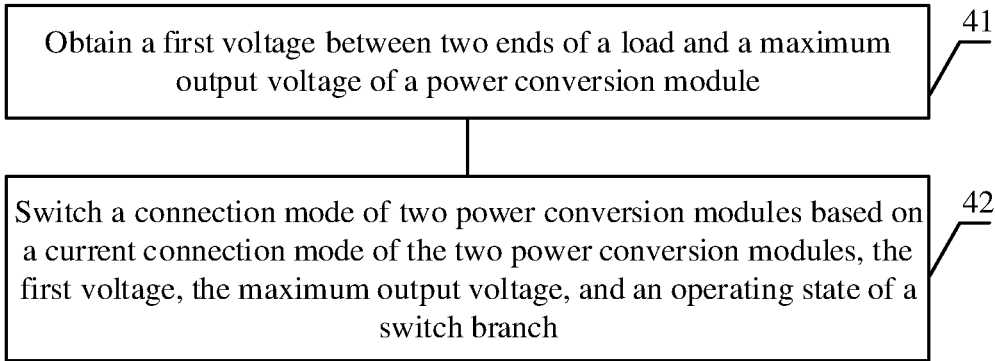
FIG. 4 is a flowchart of a series-parallel switching method according to an embodiment of this application.

FIG. 4 is a flowchart of a series-parallel switching method according to an embodiment of this application. The series-parallel switching method is applied to a power conversion circuit, where the power conversion circuit is configured to connect to a load, the power conversion circuit includes two power conversion modules, the two power conversion modules are connected in series or connected in parallel, and the power conversion module includes a switch branch. The series-parallel switching method includes the following steps.

Step 41: Obtain a first voltage between two ends of a load and a maximum output voltage of the power conversion module.

The load is an electronic component connected to both ends of an output power supply of the power conversion circuit. It is an apparatus for consuming electric energy, that is, an apparatus using electric energy for operation, and may also be referred to as an electric apparatus. The first voltage between both ends of the load is an operation voltage required by the load for normal operation. The maximum output voltage of the power conversion module is a rated output voltage of the power conversion module.

Step 42: Switch a connection mode of the two power conversion modules based on a current connection mode of the two power conversion modules, the first voltage, the maximum output voltage, and an operating state of the switch branch.

The connection mode of the two power conversion modules includes a series connection and a parallel connection. The operating state of the switch branch includes a stopping state and a running state. Similarly, when the switch branch is in the stopping state, the switch branch does not transfer energy, and when the switch branch is in the running state, the switch branch transfers energy.

In this embodiment, a series-parallel switching process of the two power conversion modules is only related to parameters of the two power conversion modules and the switch branch in the power conversion module, and there is no need to add an additional electronic component. Therefore, the power conversion circuit can have lower costs and a smaller volume. In addition, the switch branch in the power conversion module is used, and an existing control solution can be improved to obtain a solution to controlling the switch branch in the series-parallel switching process. This helps simplify the control solution in the series-parallel switching process and reduce difficulty in control.

Figure 5:
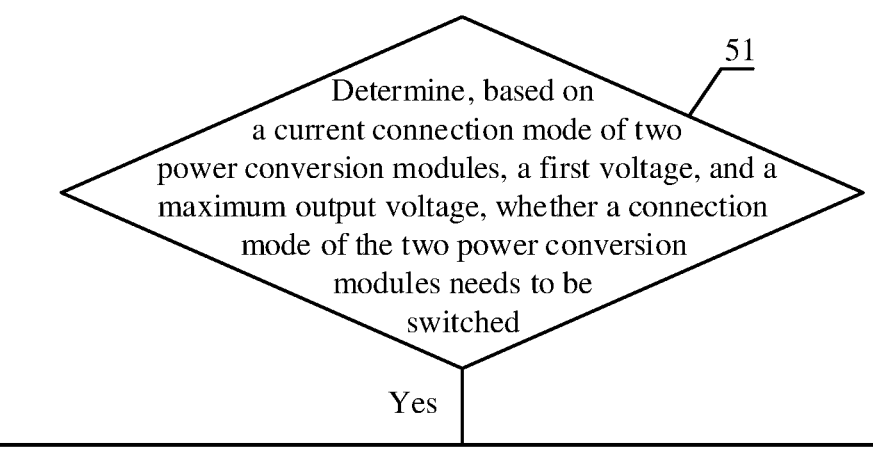
FIG. 5 is a schematic diagram of an implementation of step 42 shown in FIG. 4 according to an embodiment of this application.

In an embodiment, as shown in FIG. 5, the process of switching a connection mode of the two power conversion modules based on a current connection mode of the two power conversion modules, the first voltage, the maximum output voltage, and an operating state of the switch branch in step 42 includes the following steps.

Step 51: Determine, based on the current connection mode of the two power conversion modules, the first voltage, and the maximum output voltage, whether the connection mode of the two power conversion modules needs to be switched.

Step 52: If the connection mode of the two power conversion modules needs to be switched, switch the connection mode of the two power conversion modules based on the operating state of the switch branch.

Before the connection mode of the two power conversion modules is switched, it is first necessary to determine whether switching is required. Based on the first voltage required by the load, an output voltage of the power conversion module, and the current connection mode of the two power conversion modules, it can be more accurately determined whether the current connection mode of the two power conversion modules can enable the power conversion modules to have higher operation efficiency, and whether a voltage that can be provided can satisfy the first voltage required by the load. Therefore, it can be more accurately determined whether switching is required. This helps reduce a probability of wrong switching and provide operation stability of the power conversion circuit.

In an embodiment, if the current connection mode of the two power conversion modules is the series connection, and the first voltage is less than a difference between the maximum output voltage and a first voltage threshold, the connection mode of the two power conversion modules needs to be switched.

The two power conversion modules include a first power conversion module and a second power conversion module. When the first power conversion module and the second power conversion module are connected in series, a total voltage output by the power conversion circuit is a sum of an output voltage of the first power conversion module and an output voltage of the second power conversion module. The first voltage V1 required by the load is less than the difference between the maximum output voltage Vmax of either of the power conversion modules and the first voltage threshold Vh1, that is, V1<Vmax−Vh1. Usually, the first voltage threshold Vh1 is greater than 0. In this case, the maximum output voltage Vmax of either of the power conversion modules is greater than the first voltage V1, and a single power conversion module can already meet the operation voltage required by the load. In this case, the two power conversion modules can be switched from the series connection to the parallel connection, so that an actual output voltage of a single power conversion module is closer to the maximum output voltage of the power conversion module. This helps improve conversion efficiency and conversion accuracy of the power conversion module and therefore can improve operation stability of the power conversion circuit.

It can be understood that the first voltage threshold may be set based on an actual application. This is not limited in this embodiment of this application. For example, in an embodiment, any value, such as 10 V, within a range of [5 V, 10 V] may be selected as the first voltage threshold.

In another embodiment, if the current connection mode of the two power conversion modules is the parallel connection, and the first voltage is greater than a sum of the maximum output voltage and a second voltage threshold, the connection mode of the two power conversion modules needs to be switched.

The two power conversion modules include a first power conversion module and a second power conversion module. When the first power conversion module and the second power conversion module are connected in parallel, an output voltage of the first power conversion module is equal to an output voltage of the second power conversion module, that is, a total voltage output by the power conversion circuit is the output voltage of either of the power conversion modules. The first voltage V1 required by the load is greater than the sum of the maximum output voltage Vmax of either of the power conversion modules and the second voltage threshold Vh2, that is, V1>Vmax+Vh2. Usually, the second voltage threshold Vh2 is greater than 0. In this case, the maximum output voltage Vmax of either of the power conversion modules is less than the first voltage V1, that is, the total voltage output by the power conversion circuit cannot meet the operation voltage required by the load. In this case, the two power conversion modules can be switched from the parallel connection to the series connection, so that the total voltage output by the power conversion circuit is the sum of the output voltages of the two power conversion modules. In other words, the total voltage output by the power conversion circuit is increased to meet the first voltage required by the load. This helps maintain operation stability of the load.

It can be understood that the second voltage threshold may be set based on an actual application and that the second voltage threshold may be the same as or different from the first voltage threshold. This is not limited in this embodiment of this application. For example, in an embodiment, any value, such as 5 V, within a range of [5 V, 10 V] may be selected as the second voltage threshold.

In an embodiment, if the power conversion circuit is shown in FIG. 3, the power conversion circuit further includes a first switch S1, a second switch S2, and a third switch S3 that are connected in sequence. The power conversion module further includes an output terminal. The output terminal of the first power conversion module 21 includes a first end 212 and a second end 213, and the output terminal of the second power conversion module 22 includes a first end 222 and a second end 223. A connection relationship between the first switch S1, the second switch S2, the third switch S3 and the output terminal of the power conversion module has been described in the foregoing embodiment. Details are not described herein again.

As shown in FIG. 6, in this case, the switching the connection mode of the two power conversion modules based on the operating state of the switch branch in step 52 may specifically include the following step.

Step 61: Control the first switch S1, the second switch S2, and the third switch S3 to switch between on/off states, and control the switch branch to switch the operating state, to switch the connection mode of the two power conversion modules.

The on/off states of the switch branch include turn-on and turn-off.

Specifically, controlling the first switch S1, the second switch S2, and the third switch S3 to switch between the on/off states may be used for switching the two power conversion modules from the series connection to the parallel connection, or used for switching the two power conversion modules from the parallel connection to the series connection. By controlling the switch branch to switch the operating state, it is possible to provide an energy discharge loop or a charge loop in the series-parallel switching process of the two power conversion modules. It can be learned that the series-parallel switching process of the two power conversion modules can be implemented by controlling the first switch S1, the second switch S2, and the third switch S3 to switch between the on/off states and controlling the switch branch to switch the operating state. Moreover, in this process, there is no need to add an additional discharge branch or charge branch. Therefore, the costs and volume can be reduced. In addition, an existing solution to controlling the switch branch may be simply improved to obtain a solution to controlling the switch branch to implement an energy discharge process or a charge process. This helps simplify the control solution in the series-parallel switching process and reduce difficulty in control.

In an embodiment, the switch branch of the power conversion circuit includes a first switch branch, and the first switch branch is connected to the output terminal of the power conversion module. To be specific the power conversion circuit may be shown in FIG. 3, the first power conversion module 21 includes a first switch branch 211, and the second power conversion module 22 includes a first switch branch 221. The first switch branch 211 is connected to the first end 212 and the second end 213 of the output terminal of the first power conversion module 21 respectively, and the first switch branch 221 is connected to the first end 222 and the second end 223 of the output terminal of the second power conversion module 22 respectively.

As shown in FIG. 7, the controlling the first switch, the second switch, and the third switch to switch between on/off states, and controlling the switch branch to switch the operating state, to switch the connection mode of the two power conversion modules in step 61 may specifically include the following steps.

Step 71: Under a condition that the connection mode of the two power conversion modules is switched from the parallel connection to the series connection, control the first switch and the third switch to be off, and delay for first duration.

Step 72: Apply a first control signal to the first switch branch at an end time of the first duration to control the first switch branch to switch from the stopping state to the running state.

Step 73: Under a condition a voltage between the first end and the second end of the output terminal of either of the power conversion modules is not greater than a third voltage threshold, control the first switch to be on.

The power conversion circuit shown in FIG. 3 is used as an example for description. In this embodiment, assuming that the current connection mode of the two power conversion modules is the parallel connection, the first switch S1 and the third switch S3 are on, and the second switch S2 is off. To switch the current connection mode of the two power conversion modules to the series connection, it is necessary to first turn off the first switch S1 and the third switch S3 and delay for the first duration. The first duration is used to determine that both the first switch S1 and the third switch S3 are already off. It can be understood that the first duration may be set based on characteristics of actual electronic components selected by a user as the first switch S1 and the third switch S3. This is not limited in this embodiment of this application. For example, in an embodiment, relays are selected as both the first switch S1 and the third switch S3. Usually within 100 ms, a relay can perform a complete turn-on or turn-off action. In this case, the first duration may be set to 100 ms.

Then the first control signal is applied to the first switch branch 211 of the first power conversion module 21 and the first switch branch 221 of the second power conversion module 22 at the end time of the first duration, so that the first switch branch 211 of the first power conversion module 21 and the first switch branch 221 of the second power conversion module 22 are switched to the running state to provide an energy discharge loop. The first control signal is a signal for controlling the first switch branch 211 of the first power conversion module 21 and the first switch branch 221 of the second power conversion module 22 to switch the operating state. Then both the two power conversion modules discharge energy through the energy discharge loop. To be specific, energy of the first power conversion module 21 is transferred from the output terminal of the first power conversion module 21 to the first switch branch 211, and energy of the second power conversion module 22 is transferred from the output terminal of the second power conversion module 22 to the first switch branch 221. In this way, the voltage between the first end 212 and the second end 213 of the output terminal of the first power conversion module 21 is decreased, and the voltage between the first end 222 and the second end 223 of the output terminal of the second power conversion module 22 is also decreased.

This process is continued until the voltage between the first end 212 and the second end 213 of the output terminal of the first power conversion module 21 is not greater than (that is, less than or equal to) the third voltage threshold, while the voltage between the first end 222 and the second end 223 of the output terminal of the second power conversion module 22 is not greater than (that is, less than or equal to) the third voltage threshold. Then the second switch S2 is controlled to be on, thereby completing the switching process of switching from the parallel connection to the series connection. In this process, the first switch branch in either of the power conversion modules is used skillfully to discharge energy, and there is no need to add an additional discharge branch. Therefore, the costs can be reduced, and the volume can be reduced. In addition, the existing control solution can be used for reference, to obtain a solution to controlling the first switch branch to implement the energy discharge process. This helps reduce difficulty in control.

It can be understood that the third voltage threshold may be set based on an actual application. This is not limited in this embodiment of this application. In an implementation, the third voltage threshold may be set to half the voltage Vo1 output by either of the power conversion modules when the two power conversion modules are connected in parallel, so that a value of the total voltage output by the power conversion circuit is equal to a value of the voltage Vo1 when the two power conversion modules are switched to the series connection.

In another embodiment, the switch branch in the power conversion circuit includes a second switch branch, and the power conversion module further includes an input terminal, where the second switch branch is connected to the input terminal of the power conversion module. To be specific, the power conversion circuit may be shown in FIG. 3, the first power conversion module 21 includes a second switch branch 214, and the second power conversion module 22 includes a second switch branch 224. The second switch branch 214 of the first power conversion module 21 is connected to a first end 215 and a second end 216 of the input terminal of the first power conversion module 21 respectively, and the second switch branch 224 of the second power conversion module 22 is connected to a first end 225 and a second end 226 of the input terminal of the second power conversion module 22 respectively.

As shown in FIG. 8, the controlling the first switch, the second switch, and the third switch to switch between on/off states, and controlling the switch branch to switch the operating state, to switch the connection mode of the two power conversion modules in step 61 may specifically include the following steps.

Step 81: Under a condition the connection mode of the two power conversion modules is switched from the series connection to the parallel connection, control the second switch to be off, and delay for second duration.

Step 82: Apply a second control signal to the second switch branch at an end time of the second duration to control the second switch branch to switch from the stopping state to the running state.

Step 83: Under a condition a voltage between the first end and the second end of the output terminal of either of the power conversion modules is not less than a fourth voltage threshold, control the first switch and the third switch to be on.

The power conversion circuit shown in FIG. 3 is also used as an example for description. In this embodiment, assuming that the current connection mode of the two power conversion modules is the series connection, the second switch S2 is on, and the first switch S1 and the third switch S3 are off. To switch the current connection mode of the two power conversion modules to the parallel connection, it is necessary to first turn off the second switch S2 and delay for the second duration. The second duration is used to determine that the second switch S2 is already off. It can be understood that the second duration may be set based on characteristics of an actual electronic component selected by the user as the second switch S2. This is not limited in this embodiment of this application. For example, in an embodiment, if a relay is also selected as the second switch S2, the second duration may also be set to 100 ms.

Then the second control signal is applied to the second switch branch 214 of the first power conversion module 21 and the second switch branch 224 of the second power conversion module 22 at the end time of the second duration, so that the second switch branch 214 of the first power conversion module 21 and the second switch branch 224 of the second power conversion module 22 are switched to the running state to provide a charge loop. The second control signal is a signal for controlling the second switch branch 214 of the first power conversion module 21 and the second switch branch 224 of the second power conversion module 22 to switch the operating state. Then energy of the first power conversion module 21 is transferred from the input terminal of the first power conversion module 21 to the output terminal of the first power conversion module 21 through the second switch branch 214, and energy of the second power conversion module 22 is transferred from the input terminal of the second power conversion module 22 to the output terminal of the second power conversion module 22 through the second switch branch 224. In this way, the voltage between the first end 212 and the second end 213 of the output terminal of the first power conversion module 21 is increased, and the voltage between the first end 222 and the second end 223 of the output terminal of the second power conversion module 22 is also increased.

This process is continued until the voltage between the first end 212 and the second end 213 of the output terminal of the first power conversion module 21 is not less than (that is, greater than or equal to) the fourth voltage threshold, while the voltage between the first end 222 and the second end 223 of the output terminal of the second power conversion module 22 is not less than (that is, greater than or equal to) the fourth voltage threshold. Then the first switch S1 and the third switch S3 are controlled to be on, thereby completing the switching process of switching from the series connection to the parallel connection. In this process, the second switch branch in either of the power conversion modules is also used to implement the process of charging the output terminal of either of the power conversion modules, and no additional charge branch is added. Therefore, the costs can be reduced, and the volume can be reduced. In addition, the existing control solution can be used for reference, to obtain a solution to controlling the second switch branch to implement the charge process. This helps reduce difficulty in control.

It can be understood that the fourth voltage threshold may be set based on an actual application. This is not limited in this embodiment of this application. In an implementation, the fourth voltage threshold may be set to the total voltage Vo2 output by the power conversion circuit when the two power conversion modules are connected in series, so that a value of the voltage output by either of the power conversion modules is equal to a value of the total voltage Vo2 when the two power conversion modules are switched to the parallel connection. In this case, because the voltages output by the two power conversion modules are also approximately equal, a loop current that may be generated during the parallel connection of the two power conversion modules can be reduced, and a risk of damage to each electronic component of the power conversion module can be reduced. This helps extend a service life of each electronic component, to improve stability of the power conversion circuit.

In an embodiment, referring to FIG. 3 and FIG. 9, FIG. 9 is a schematic diagram of a circuit structure corresponding to the first power conversion module 21 in the power conversion circuit shown in FIG. 3 according to an embodiment of this application.

As shown in FIG. 9, the first switch branch 211 of the first power conversion module 21 includes a first switching transistor Q1, a second switching transistor Q2, a third switching transistor Q3, and a fourth switching transistor Q4. Moreover, the first switch branch 211 is connected to the load through the output terminal, and the load is, for example, a third capacitor C3 and a first resistor R1 that are connected in parallel. The second switch branch 214 of the first power conversion module 21 includes a fifth switching transistor Q5, a sixth switching transistor Q6, a seventh switching transistor Q7, and an eighth switching transistor Q8. Moreover, the second switch branch 214 is connected to an input power supply U1 through the input terminal. The first power conversion module 21 further includes a resonant cavity 217, where the resonant cavity 217 is connected between the first switch branch 211 and the second switch branch 214, and the resonant cavity 217 is used to implement transfer of AC energy.

It should be understood that a circuit of the second power conversion module 22 and the first power conversion module 21 may both use the circuit structure shown in FIG. 9. In addition, during switching between the series connection mode and the parallel connection mode, control modes of the first switch branches in different power conversion modules may be the same, and control modes of the second switch branches may also be the same. Therefore, only the first power conversion module 21 is used as an example herein. An actual application process of the second power conversion module 22 is similar to that of the first power conversion module 21, and is within the scope easily understood by persons skilled in the art. Details are not described herein again.

Figure 10:
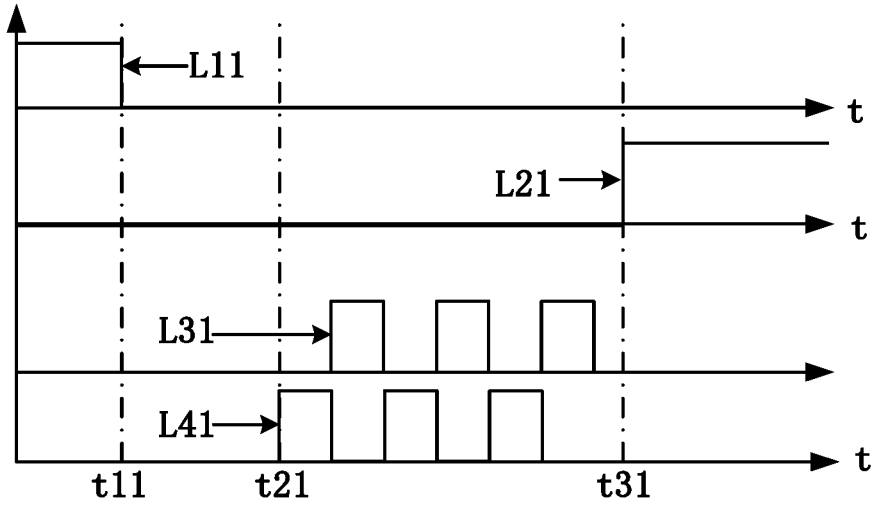
FIG. 10 is a schematic diagram of various control signals in a power conversion circuit according to an embodiment of this application.

In an embodiment, FIG. 10 shows control signals of the first switch, the second switch, the third switch, and the first switch branch in the power conversion circuit in a process of switching the two power conversion modules from the parallel connection to the series connection. A horizontal coordinate t represents time and a vertical coordinate represents a level. A curve L11 is a control signal of the first switch S1 and the third switch S3; a curve L21 is a control signal of the second switch S2; a curve L31 and a curve L41 are control signals of the first switch branch 211. If the curve L31 may be a control signal of the first switching transistor Q1 and the fourth switching transistor Q4, the curve L41 is a control signal of the second switching transistor Q2 and the third switching transistor Q3, or conversely, if the curve L41 may be a control signal of the first switching transistor Q1 and the fourth switching transistor Q4, the curve L31 is a control signal of the second switching transistor Q2 and the third switching transistor Q3. It should be understood that the first control signal in the foregoing embodiment includes the curve L31 and the curve L41.

In this embodiment, before a time t11, the control signal of the first switch S1 and the third switch S3 is a high level signal, and in this case, the first switch S1 and the third switch S3 are on; the control signal of the second switch S2 is a low level signal, and in this case, the second switch S2 is off, and the two power conversion modules are connected in parallel. The process of switching the two power conversion modules to the series connection starts at the time t11. In this case, the control signal of the first switch S1 and the third switch S3 is pulled down to a low level, that is, the first switch S1 and the third switch S3 are turned off, and the process delays for the first duration.

The first control signal is applied to the first switch branch 211 at the end time of the first duration, that is, a time t21. In this case, the first control signal is a PWM waveform with a fixed switching frequency and duty cycle, applied to the first switching transistor Q1, the second switching transistor Q2, the third switching transistor Q3, and the fourth switching transistor Q4. Specifically, a same PWM waveform (such as the curve L31) is applied to the first switching transistor Q1 and the fourth switching transistor Q4, a same PWM waveform (such as the curve L41) is applied to the second switching transistor Q2 and the fourth switching transistor Q4, and the curve L31 and the curve L41 should have a complementary relationship. In this way, the first switch branch 211 is switched from the stopping state to the running state to transfer energy of the first power conversion module 21 from right to left, that is, from the output terminal to the input terminal, and energy of the first power conversion module 21 is reduced. Similarly, in this case, energy of the second power conversion module 22 is also reduced.

At a time t31, when it is detected that the voltage between the first end 212 and the second end 213 of the output terminal of the first power conversion module 21 is not greater than the third voltage threshold and that the voltage between the first end 222 and the second end 223 of the output terminal of the second power conversion module 22 is not greater than the third voltage threshold, the control signal of the second switch S2 is pulled up to a high level, that is, the second switch S2 is turned on, thereby completing the switching of the two power conversion modules from the parallel connection to the series connection.

Figure 11:
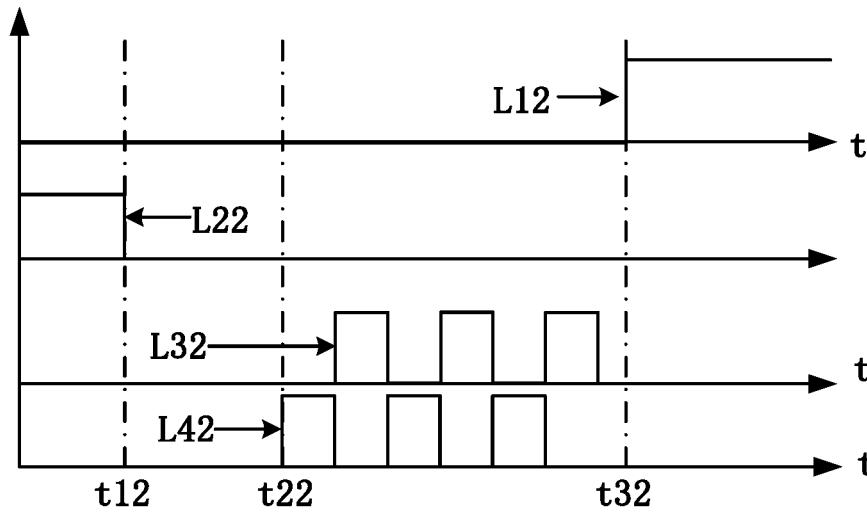
FIG. 11 is a schematic diagram of various control signals in a power conversion circuit according to another embodiment of this application.

In another embodiment, referring to FIG. 3, FIG. 9, and FIG. 11, FIG. 11 shows control signals of the first switch, the second switch, the third switch, and the second switch branch in the power conversion circuit in a process of switching the two power conversion modules from the series connection to the parallel connection. A horizontal coordinate t represents time and a vertical coordinate represents a level. A curve L12 is a control signal of the first switch S1 and the third switch S3; a curve L22 is a control signal of the second switch S2; a curve L32 and a curve L42 are control signals of the second switch branch 214. If the curve L32 may be a control signal of the fifth switching transistor Q5 and the eighth switching transistor Q8, the curve L42 is a control signal of the sixth switching transistor Q6 and the seventh switching transistor Q7, or conversely, if the curve L42 may be a control signal of the fifth switching transistor Q5 and the eighth switching transistor Q8, the curve L32 is a control signal of the sixth switching transistor Q6 and the seventh switching transistor Q7. It should be understood that the second control signal in the foregoing embodiment includes the curve L32 and the curve L42.

In this embodiment, before a time t12, the control signal of the first switch S1 and the third switch S3 is a low level signal, and in this case, the first switch S1 and the third switch S3 are off; the control signal of the second switch S2 is a high level signal, and in this case, the second switch S2 is on, and the two power conversion modules are connected in series. Switching of the two power conversion modules to the parallel connection starts at the time t12. In this case, the control signal of the second switch S2 is pulled down to a low level, that is, the second switch S2 is turned off, and the process delays for the second duration.

The second control signal is applied to the second switch branch 214 at the end time of the second duration, that is, a time t22. In this case, the second control signal is a PWM waveform with a fixed switching frequency and duty cycle, applied to the fifth switching transistor Q5, the sixth switching transistor Q6, the seventh switching transistor Q7, and the eighth switching transistor Q8. Specifically, a same PWM waveform (such as the curve L32) is applied to the fifth switching transistor Q5 and the eighth switching transistor Q8, a same PWM waveform (such as the curve L42) is applied to the sixth switching transistor Q6 and the seventh switching transistor Q7, and the curve L32 and curve L42 should have a complementary relationship. In this way, the second switch branch 214 is switched from the stopping state to the running state to transfer energy of the first power conversion module 21 from left to right, that is, from the input terminal to the output terminal, and energy of the first power conversion module 21 is increased. Similarly, in this case, energy of the second power conversion module 22 is also increased.

At a time t32, when it is detected that the voltage between the first end 212 and the second end 213 of the output terminal of the first power conversion module 21 is not less than the fourth voltage threshold and that the voltage between the first end 222 and the second end 223 of the output terminal of the second power conversion module 22 is not less than the fourth voltage threshold, the control signal of the first switch S1 and the third switch S3 is pulled up to a high level, so that the first switch S1 and the third switch S3 are turned on, thereby completing the switching of the two power conversion modules from the series connection to the parallel connection.

In summary, in the foregoing embodiment, in the process of switching the two power conversion modules in the power conversion circuit from the series connection to the parallel connection or from the parallel connection to the series connection, energy transfer can be implemented through electronic components included in the power conversion module, and no additional electronic component is added as in the related art. Therefore, the costs of the power conversion circuit can be reduced, and the volume of the power conversion circuit can be reduced. In addition, the existing control solution can be used for reference. This helps simplify the control solution in the series-parallel switching process and reduce difficulty in control.

Figure 12:
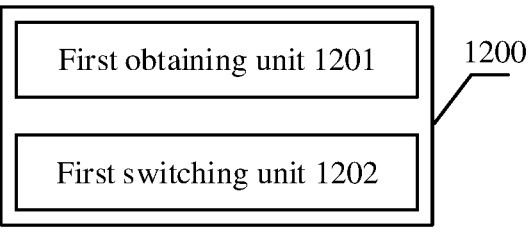
FIG. 12 is a schematic structural diagram of a series-parallel switching apparatus according to an embodiment of this application.

FIG. 12 is a schematic structural diagram of a series-parallel switching apparatus according to an embodiment of this application. The apparatus is applied to a power conversion circuit. For the structure of the power conversion circuit, reference may be made to the foregoing detailed description with respect to FIG. 2 and FIG. 3. Details are not described herein again. The series-parallel switching apparatus 1200 includes a first obtaining unit 1201 and a first switching unit 1202.

The first obtaining unit 1201 is configured to obtain a first voltage between two ends of a load and a maximum output voltage of a power conversion module.

The first switching unit 1202 is configured to switch a connection mode of two power conversion modules based on a current connection mode of the two power conversion modules, the first voltage, the maximum output voltage, and an operating state of a switch branch, where the connection mode includes a series connection and a parallel connection, and the operating state includes a stopping state and a running state.

In an embodiment, the first switching unit 1202 is further configured to: determine, based on the current connection mode of the two power conversion modules, the first voltage, and the maximum output voltage, whether the connection mode of the two power conversion modules needs to be switched; and if the connection mode of the two power conversion modules needs to be switched, switch the connection mode of the two power conversion modules based on the operating state of the switch branch.

In an embodiment, the first switching unit 1202 is further configured to: under a condition the current connection mode of the two power conversion modules is the series connection, and the first voltage is less than a difference between the maximum output voltage and a first voltage threshold, determine that the connection mode of the two power conversion modules needs to be switched.

In an embodiment, the first switching unit 1202 is further configured to: under a condition the current connection mode of the two power conversion modules is the parallel connection, and the first voltage is greater than a sum of the maximum output voltage and a second voltage threshold, determine that the connection mode of the two power conversion modules needs to be switched.

In an embodiment, the first switching unit 1202 is further configured to: control a first switch, a second switch, and a third switch to switch between on/off states, and control the switch branch to switch the operating state, to switch the connection mode of the two power conversion modules, where the on/off states include turn-on and turn-off.

In an embodiment, the first switching unit 1202 is further configured to: under a condition the connection mode of the two power conversion modules is switched from the parallel connection to the series connection, control the first switch and the third switch to be off, and delay for first duration; apply a first control signal to a first switch branch at an end time of the first duration to control the first switch branch to switch from the stopping state to the running state; and under a condition a voltage between a first end and a second end of an output terminal of either of the power conversion modules is not greater than a third voltage threshold, control the second switch to be on.

In an embodiment, the first switching unit 1202 is further configured to: under a condition the connection mode of the two power conversion modules is switched from the series connection to the parallel connection, control the second switch to be off, and delay for second duration; apply a second control signal to a second switch branch at an end time of the second duration to control the second switch branch to switch from the stopping state to the running state; and under a condition a voltage between the first end and the second end of the output terminal of either of the power conversion modules is not less than a fourth voltage threshold, control the first switch and the third switch to be on.

The foregoing apparatus can perform the method provided in the embodiment of this application shown in FIG. 4, has corresponding functional modules for performing the method, and achieves the same beneficial effects. For technical details not exhaustively described in this embodiment, reference may be made to the method provided in the embodiments of this application.

Figure 13:
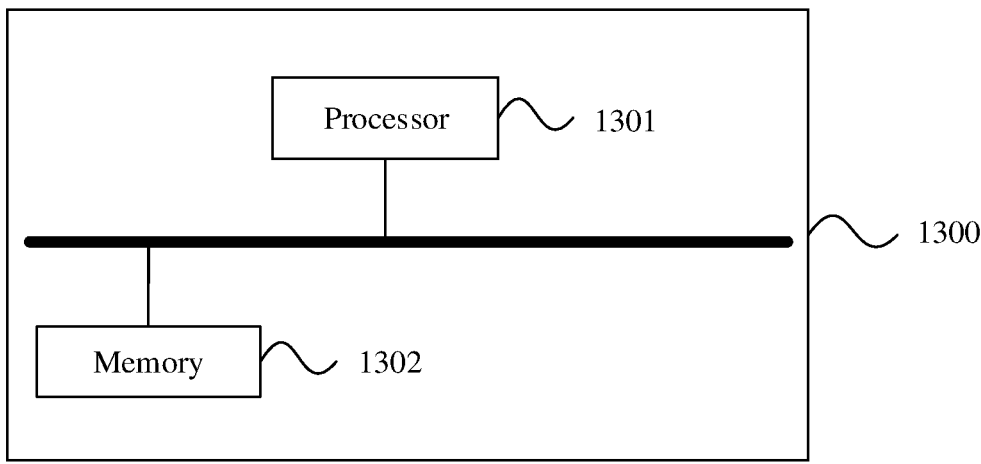
FIG. 13 is a schematic structural diagram of a series-parallel switching apparatus according to another embodiment of this application.

FIG. 13 is a schematic structural diagram of a series-parallel switching apparatus according to an embodiment of this application. As shown in FIG. 13, the series-parallel switching apparatus 1300 includes one or more processors 1301 and a memory 1302. One processor 1301 is used as an example in FIG. 13.

The processor 1301 and the memory 1302 may be connected to each other by using a bus or by other means, for example, connected by using a bus in FIG. 13.

The memory 1302, as a non-volatile computer-readable storage medium, may be configured to store non-volatile software programs, non-volatile computer-executable programs, and modules, such as program instructions/modules corresponding to the series-parallel switching method in the embodiments of this application (such as the units described in FIG. 12). By running the non-volatile software programs, instructions, and modules stored in the memory 1302, the processor 1301 executes various functional applications and data processing in the series-parallel switching apparatus, that is, implements the series-parallel switching method in the foregoing method embodiments and functions of the units in the foregoing apparatus embodiment.

The memory 1302 may include a high-speed random access memory, and may further include a non-volatile memory, for example, at least one disk storage device, a flash memory device, or other non-volatile solid-state storage devices. In some embodiments, the memory 1302 may optionally include a memory that is remotely disposed relative to the processor 1301, and the remote memory may be connected to the processor 1301 through a network. Examples of the network include but are not limited to the Internet, corporate intranet, local area network, mobile communication network, and a combination thereof.

The program instructions/modules are stored in the memory 1302. When the program instructions/modules are executed by the one or more processors 1301, the series-parallel switching method in any one of the method embodiments is performed. For example, steps shown in FIG. 4, FIG. 5, FIG. 6, FIG. 7, and FIG. 8 are performed, or functions of the units in FIG. 12 may be implemented.

An embodiment of this application further provides a charging device, including the power conversion circuit according to any one of the foregoing embodiments and/or the series-parallel switching apparatus according to any one of the foregoing embodiments.

In an embodiment, the charging device is a charging pile or a charger.

An embodiment of this application further provides a non-volatile computer storage medium, where the computer storage medium stores computer-executable instructions, and when the computer-executable instructions are executed by one or more processors, the one or more processors may be enabled to perform the series-parallel switching method according to any one of the foregoing method embodiments. For example, steps shown in FIG. 4, FIG. 5, FIG. 6, FIG. 7, and FIG. 8 are performed, or functions of the units in FIG. 12 may be implemented.

The foregoing apparatus or device embodiments are merely examples. Modules or units described as separate components may or may not be physically separate. Parts shown as modules or units may be or may not be physical units, and may be located in one place, or may be distributed in a plurality of network modules or units. Some or all of the modules may be selected based on an actual requirement, to achieve the objectives of the solutions in the embodiments.

Based on the foregoing descriptions of the implementations, persons skilled in the art may clearly understand that each implementation can be implemented by using software in combination to a universal hardware platform, or by using hardware only. Based on such an understanding, the technical solutions substantially or parts making contributions to the related art may be embodied in a form of a software product, and the software product may be stored in a computer-readable storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments.

Although this application has been described with reference to the preferred embodiments, various modifications can be made to this application without departing from the scope of this application and the components therein can be replaced with equivalents. In particular, as long as there is no structural conflict, various technical features mentioned in the embodiments can be combined in any manner. This application is not limited to the specific embodiments disclosed in this specification, but includes all technical solutions falling within the scope of the claims.

What is claimed is:

1. A power conversion circuit, comprising:
a control unit, and two power conversion modules connected to the control unit, wherein
the two power conversion modules are configured to be connected in a series connection mode or in a parallel connection mode;
wherein each power conversion module comprises:
an output terminal and a first switch branch, the first switch branch is connected to the output terminal, and the output terminal is connected to a load; and
an input terminal and a second switch branch, the second switch branch is connected to the input terminal, and the input terminal is connected to a power grid;
wherein an operating state of the first switch branch and the second switch branch each comprises a stopping state and a running state;
the first switch branch is configured to switch the operating state of the first switching branch from the stopping state to the running state according to a first control signal output by the control unit, to provide an energy discharge loop when the two power conversion modules are switched from the parallel connection mode to the series connection mode, wherein energy stored in the two power conversion modules is released to the power grid via the energy discharge loop; and
the second switch branch is configured to switch the operating state of the second switching branch from the stopping state to the running state according to a second control signal output by the control unit, to charge the output terminal using the power grid when the two power conversion modules are switched from the series connection mode to the parallel connection mode.

2. The power conversion circuit according to claim 1, wherein the power conversion circuit further comprises a first switch, a second switch, and a third switch that are connected in series, and the two power conversion modules comprise a first power conversion module and a second power conversion module,
wherein
a first end of the first switch is connected to a first end of the output terminal of the first power conversion module, a second end of the first switch is connected to a first end of the output terminal of the second power conversion module and a first end of the second switch, a second end of the second switch is connected to a second end of the output terminal of the first power conversion module and a first end of the third switch, and a second end of the third switch is connected to a second end of the output terminal of the second power conversion module;

wherein when the first switch and the third switch are on and the second switch is off, the two power conversion modules are connected in parallel; or when the second switch is on and the first switch and the third switch are off, the two power conversion modules are connected in series.

3. The power conversion circuit according to claim 1, wherein the control unit is configured to:

obtain a first voltage between two ends of the load and a maximum output voltage of each power conversion module;

determine whether to switch the connection mode of the power conversion modules according to the first voltage between two ends of the load and the maximum output voltage of each power conversion module; and control the two power conversion modules to switch the connection mode when it is determined that the connection mode of the two power conversion modules needs to be switched.

4. The power conversion circuit according to claim 3, wherein in determining whether to switch the connection mode of the power conversion modules according to the first voltage between two ends of the load and a maximum output voltage of each power conversion module, the control unit is configured to:

when a current connection mode of the two power conversion modules is the series connection mode, and the first voltage is less than a difference between the maximum output voltage of each power conversion module and a first voltage threshold, determine that the connection mode of the two power conversion modules needs to be switched to the parallel connection mode; and when the current connection mode of the two power conversion modules is the parallel connection mode, and the first voltage is greater than a sum of the maximum output voltage of each power conversion module and a second voltage threshold, determine that the connection mode of the two power conversion modules needs to be switched to the series connection mode.

5. The power conversion circuit according to claim 2, wherein when the connection mode of the two power conversion modules is switched from the parallel connection mode to the series connection mode, the first switch and the third switch are switched to off, and delayed for a first duration;

the first control signal is applied to the first switch branch at an end of the first duration to control the first switch branch to switch from the stopping state to the running state; and when a voltage between the first end and the second end of the output terminal of either of the power conversion modules is not greater than a third voltage threshold, the second switch is switched to on.

6. The power conversion circuit according to claim 2, wherein when the connection mode of the two power conversion modules is switched from the series connection mode to the parallel connection mode, the second switch is switched to off, and delayed for a second duration;

the second control signal is applied to the second switch branch at an end of the second duration to control the second switch branch to switch from the stopping state to the running state; and when a voltage between the first end and the second end of the output terminal of either of the power conversion modules is not less than a fourth voltage threshold, the first switch and the third switch are switched to be on.

7. A charging device, comprising the power conversion circuit according to claim 1.

8. The charging device according to claim 7, wherein the charging device is a charging pile or a charger.

9. A series-parallel switching apparatus in a power conversion circuit, comprising:

a processor, and memory storing program codes for execution by the processor;

wherein the power conversion circuit is configured to connect to a load and a power grid, the power conversion circuit comprises two power conversion modules connected in a series connection mode or in a parallel connection mode, wherein each power conversion module comprises:

an output terminal and a first switch branch, the first switch branch is connected to the output terminal, and the output terminal is connected to the load;

an input terminal and a second switch branch, the second switch branch is connected to the input terminal, and the input terminal is connected to the power grid;

wherein an operating state of the first switch branch and the second switch branch each comprises a stopping state and a running state;

the first switch branch is configured to switch the operating state of the first switch branch from the stopping state to the running state according to a first control signal output by the apparatus, to provide an energy discharge loop when the two power conversion modules are switched from the parallel connection mode to the series connection mode, wherein energy stored in the two power conversion modules is released to the power grid via the energy discharge loop; and the second switch branch is configured to switch the operating state of the second switch branch from the stopping state to the running state according to a second control signal output by the apparatus, to charge the output terminal using the power grid when the two power conversion modules are switched from the series connection mode to the parallel connection mode;

wherein when executed by the processor, the program codes cause the apparatus to:

obtain a first voltage between two ends of the load and a maximum output voltage of each power conversion module;

determine whether to switch the connection mode of the power conversion modules according to the first voltage between two ends of the load and the maximum output voltage of each power conversion module; and control the two power conversion modules to switch the connection mode when it is determined that the connection mode of the two power conversion modules needs to be switched;

wherein in determining whether to switch the connection mode of the power conversion modules according to the first voltage between two ends of the load and a maximum output voltage of each power conversion module, the program codes cause the apparatus to:

when a current connection mode of the two power conversion modules is the series connection mode, and the first voltage is less than a difference between the maximum output voltage of each power conversion module and a first voltage threshold, determine that the connection mode of the two power conversion modules needs to be switched to the parallel connection mode; and when the current connection mode of the two power conversion modules is the parallel connection mode, and the first voltage is greater than a sum of the maximum output voltage of each power conversion module and a second voltage threshold, determine that the connection mode of the two power conversion modules needs to be switched to the series connection mode.

*  *  *  *  *